FIG.-1

Warren A. Alexander
William J. Stark  Inventors
By James A. Reilly  Attorney

FIG.-2

Warren A. Alexander
William J. Stark   Inventors
By *James A. Reilly*   Attorney March 31, 1964 W. A. ALEXANDER ETAL 3,127,585
MIGRATOR FOR GEOPHYSICAL EXPLORATION
Filed Feb. 6, 1958 5 Sheets-Sheet 3

FIG.-3

Warren A. Alexander
William J. Stark          Inventors
By James A. Reilly        Attorney

FIG.-4

Warren A. Alexander
William J. Stark   Inventors
By James A. Reilly Attorney

March 31, 1964   W. A. ALEXANDER ETAL   3,127,585
MIGRATOR FOR GEOPHYSICAL EXPLORATION
Filed Feb. 6, 1958                                              5 Sheets-Sheet 5

Warren A. Alexander
William J. Stark         Inventors

By James A. Reilly       Attorney

United States Patent Office 3,127,585
Patented Mar. 31, 1964

3,127,585
MIGRATOR FOR GEOPHYSICAL EXPLORATION
Warren A. Alexander and William J. Stark, Tulsa, Okla., assignors, by mesne assignments, to Jersey Production Research Company
Filed Feb. 6, 1958, Ser. No. 713,763
10 Claims. (Cl. 340—15.5)

The present invention broadly relates to a geophysical system for determining the presence and location of subterranean strata. The invention especially relates to an apparatus and procedure for analyzing seismic records and for preparing a seismic section of the earth from an unmigrated seismic section in which dipping formations are migrated to more clearly show the true locations and angles of dip.

The application of geophysics in prospecting for mineral deposits is well-known and especially in prospecting for oil. Until recently, substantially all recording apparatus for recording and measuring the travel times required for seismic waves to travel from a shot point via reflecting surfaces to detectors, made use of recording devices which generate an oscillographic trace in response to rapidly varying electrical signals. The records thus obtained were then analyzed and read and it has been possible to learn a great deal about the earth's structure through their use. However, in many instances the reflections are difficult to distinguish because of the complexity of the wave forms.

There is presently a growing interest in the use of reproducible records such as magnetic records for presenting seismic data. Variable density presentation is especially popular, since a corrected variable density seismic section affords a very striking and accurate vertical cross section or profile reproduction of the portion of the earth under study. The nature and value of variable density presentation is explained in an article entitled "The Gulf Seismic Profile Printer," published in Geophysics, volume XXII, Number 2 (April 1957), pages 286–308. The present invention has application to records and seismic sections of any reproducible or photographic type—e.g., magnetic or variable area—but it is preferably employed in connection with records and sections of the variable density type.

Regardless of type, most seismic sections—although they are normally corrected for static and for dynamic errors—are prepared with the assumption that all the formations and reflecting surfaces are substantially horizontal. In other words, any formations, reflections, or the like that have an angular or dipping disposition within such sections are characteristically illustrated at an incorrect dipping angle and location.

When working with sections in which dipping formations are indicated, it has been conventional practice on the part of persons skilled in the art to mechanically (as by means of suitable drafting instruments) and mathematically "migrate" such formations into a more correct position and dipping angle. Special drafting instruments have been suggested and developed for semi-manually and manually migrating dipping reflections in a section into corrected positions and angles of dip, but all of these devices have been subject to the same type of disadvantages that characterize the conversion of oscillographic trace records into corrected seismic traces. In other words, the various devices are time consuming in their operation; and they are additionally expensive and do not completely reproduce a record.

Broadly, the present invention is concerned with an apparatus for analyzing seismic sections which comprises (1) a section-scanning and transducer means arranged to move relative to a seismic section and to detect the apparent angles of dip of reflections in the section and (2) a recording device movable relative to a recording medium and capable of reproducing the section with the reflections in a migrated form. A linkage mechanism is coupled to the recording device and is responsive to the section-scanning means such that the recording device is moved relative to the recording medium so that apparent angles of dip and positions indicated on the unmigrated section are converted or migrated to true angles of dip and positions in the migrated section. When the migrated section is to be in effect of the variable density type, the transducer of the section-scanning means preferably modulates the intensity of a light source which directs a beam of light against a photographic film.

The scanning means which is employed to scan the original seismic section must be of a character capable of detecting the apparent angle of dip of a reflection in the section. The angle of dip thus detected controls the adjustment of a linkage mechanism which in turn adjusts the angle of a printing assembly operating on a recording medium. The printing assembly is movable relative to the recording medium and effects a complete reproduction of all the reflections in the original seismic section but in a migrated form. The linkage means, which is responsive to the scanning means, moves the printing assembly, as will be seen hereinafter, such that the angles of dip of reflections recorded on the migrated section are the true angles of dip.

Accordingly, it is an object of the present invention to provide a system for converting seismic sections that contain dipping formations into migrated sections in which errors in the locations and in the angles of dip of the formations are reduced and in most cases practically eliminated.

Other objects and a better understanding of the invention will be apparent upon reference to the ensuing description and to the attached drawing in which.

Before entering into a detailed consideration of the above figures, it is well to note that several terms in the following description are assumed to have the following meanings for the purposes of the description. The term seismogram is intended to mean a multiple trace recording of a plurality of geophone signals from a seismic observation. The term recording medium or record medium in this description is intended to mean either a non-reproducible or a reproducible type recording medium such as paper or photographic film, respectively, adapted to receive seismic information. The term seismic trace or channel is intended to mean the record formed on a record medium by reception of a train of signals from an individual geophone location. Each trace is in effect a record with time of the occurrence and magnitude of the signals received.

The term seismic section shall be intended to mean a seismogram prepared from one or more seismograms in which the individual seismic traces have been corrected for one or more seismic corrections. The individual traces that form the section are arranged in the same lateral order as the geophone locations corresponding to the traces; and the distances between the centers of variable density traces are preferably proportional to the distances between the geophone locations so as to render the final production a reasonably accurate map or vertical cross section of the portion of the earth under study.

Figure 1:
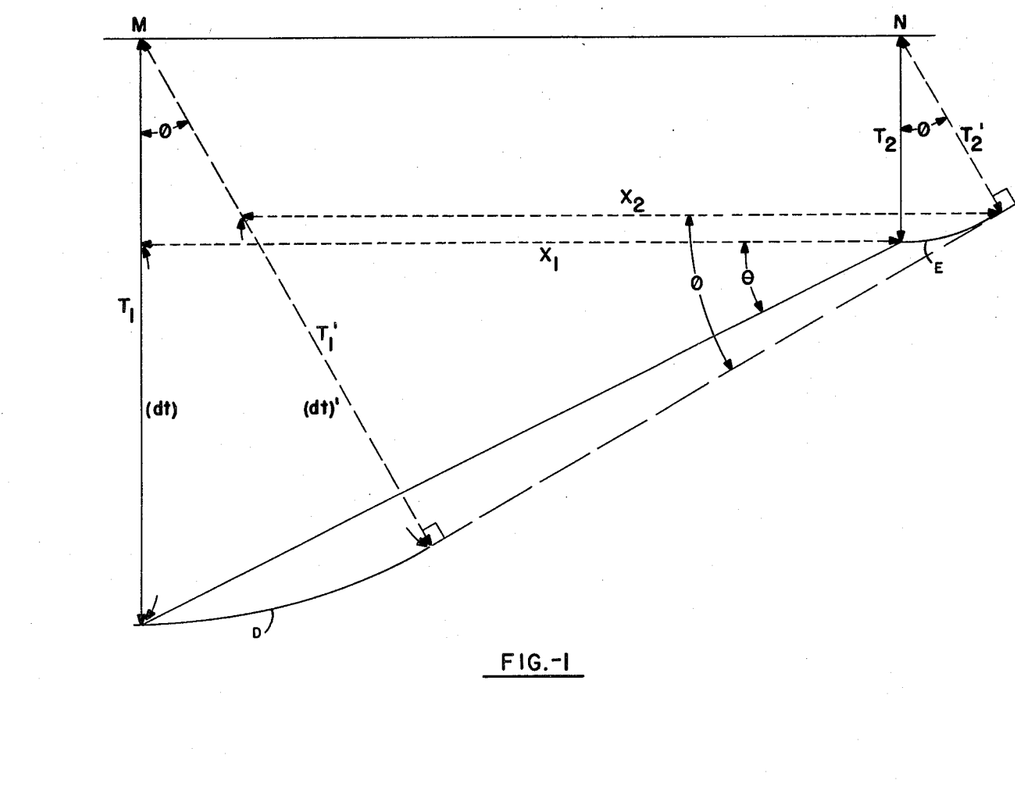
FIG. 1 illustrates a diagram showing that the sine of the angle of true dip is equal to the tangent of the angle of the apparent dip.

Having thus briefly indicated the general meanings of some of the terms to be used in the following discussion, attention is now directed to FIG. 1 of the attached drawing which illustrates a diagram showing that the sine of the angle of true dip is equal to the tangent of the angle of apparent dip. It is this relationship that is used to advantage in the present invention. In showing this relationship, constant velocity and a straight ray path for seismic wave energy will be assumed. Upon referring to FIG. 1, it will be seen, in view of the following explanation, that the tangent of $\theta$ equals the sine of $\phi$. It will be further noted that it is conventional in the art to refer to the angle $\theta$ as the apparent angle of dip and to the angle $\phi$ as the true angle of dip. $T_1$ and $T_2$ are the time intervals for reflections to be returned to two points on the surface, M and N, from the same bed or underground strata. In FIG. 1 arcs D and E with radii of $T_1$ and $T_2$ are drawn about points M and N as their respective centers. The reflection points must lie on these arcs. Assuming a straight line bed, the migrated bed must be tangent to these two arcs, and the new radii $T'_1$ and $T'_2$ are at right angles to this migrated bed. Since they make the same angle to this line, they are parallel, and are at the angle of true dip $\phi$ with the vertical. Briefly, the mathematical derivation, eliminating obvious steps, is as follows:

(1) $$T_1 - T_2 = (dt)$$
$$T_1 = T'_1 \text{ and } T_2 = T'_2$$
$$\frac{(dt)}{X_1} = \tan \theta \text{ (angle of apparent dip)}$$

(2) $$T'_1 - T'_2 = (dt)' = dt$$

Since $T'_1$ is parallel to $T'_2$ and $X_2$ is parallel to $X_1$, $X_2 = X_1$ (3) $$\frac{(dt)'}{X_2} = \frac{d(t)}{X_1} = \text{sine } \phi = \tan \theta$$

Figure 2:
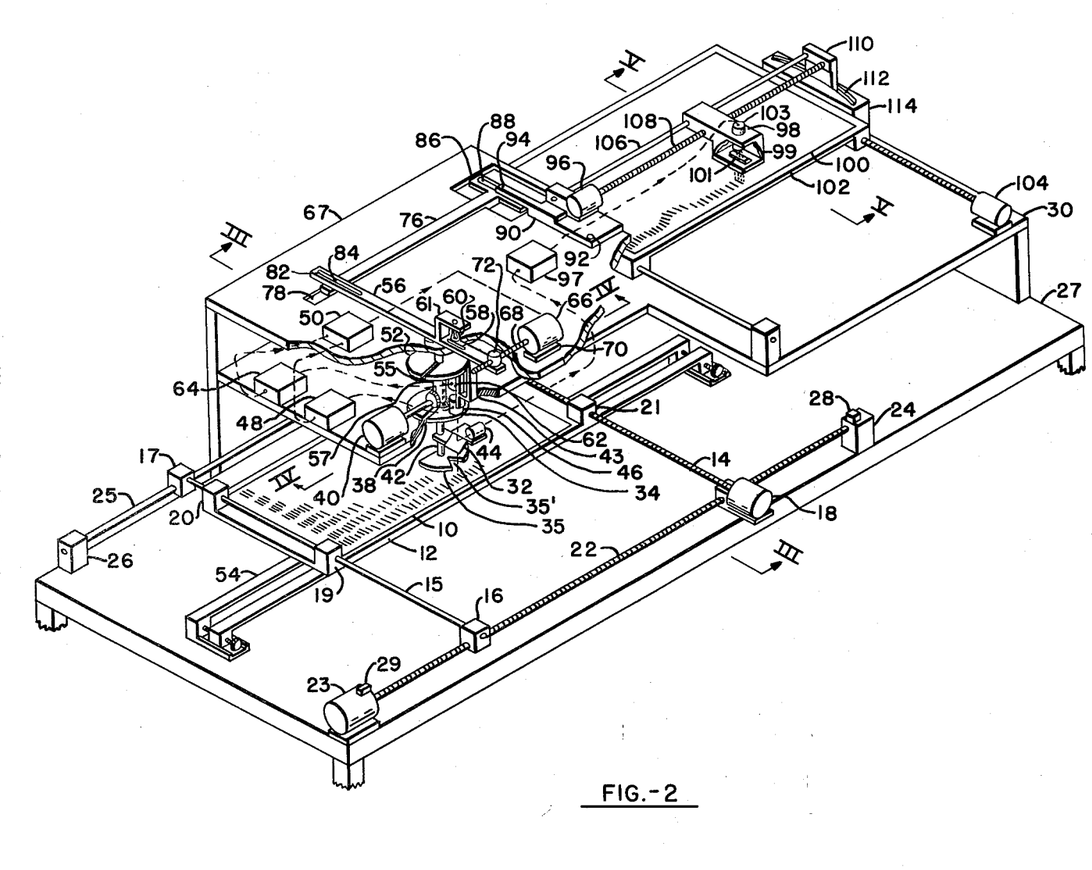
FIG. 2 is a schematic representation of an apparatus capable of carrying out or practicing the invention.

Referring to the drawing and specifically to FIG. 2, in the best mode contemplated for carrying out the invention a variable density unmigrated section 10 is mounted on a support means or carriage 12. The section as shown, has eight seismograms indicated thereon but may of course have a greater or smaller number of such seismograms. The section 10 will be assumed to be variable density in nature and will hereinafter be referred to as a variable density section. A typical variable density section is shown in FIG. 1A of the above-mentioned Gulf article. A zero seismic signal normally gives a neutral density with the change of densities being related to the polarities and amplitudes of the seismic signals, that is, an increasing amplitude of the positive signal decreases the density and conversely, an increasing amplitude of the negative signal increases the density. The density, of course, varies with the variation of the amplitude of the seismic signal and the degree of the density may be reversed with respect to the polarity of the signal if desired. By observing the direction of the alignment of the light portions or low density of adjacent traces, the apparent angle of dip of the subsurface strata under construction can be determined. The alignment can also be determined from observing the direction of the alignment of the dark portions.

The carriage 12 is supported by screw 14 and rod 15 which are parallel. One end of rod 15 is supported by traveling block 16 and the other end by sliding block 17. Screw 14 is supported from and capable of being driven by motor 18. Carriage 12 is slidably supported from rod 15 by and through mounts 19 and 20 at one end of the carriage. The other end of carriage 12 is supported from screw 14 by traveling block 21 which is rigidly attached to or made an integral part of the carriage.

The end of screw 14 opposite motor 18 is supported from another sliding block not shown, but similar to sliding block 17. A second traveling block, not shown but similar to traveling block 21, also aids in supporting carriage 12 from screw 14. This other traveling block is positioned on the carriage 12 to receive screw 14 at the corner opposite traveling block 21. Rod 15 and screw 14 are parallel. It is this part of the mechanism which gives the seismic section lateral movement—that is, movement representative of the horizontal component of the seismic section.

The traveling block 16 and motor 18 are mounted upon screw 22 which is driven by, and supported from, reversible motor 23. The other end of screw 22 is supported by mount 24. Sliding block 17 is slidably mounted on and supported by rod 25. Rod 25 is supported by mount 26 at one end and by a similar mount, not shown, at the opposite end. Mounts 24 and 26 and motor 23 are supported from base 27. Limit and sequence switch 28 is provided on mount 24. Switch 28 is so positioned as to be actuated when the frame of motor 18 is driven by a screw 22 to a point where contact is made between the motor frame and the switch 28. This reverses the direction of rotation of motor 23 which reverses the rotation of screw 22 and drives the seismic section in the opposite direction from which it was being driven. Switch 28 also actuates motor 18 to drive the seismic section laterally a predetermined distance each time the sequence switch is actuated. Limit and sequence switch 29, which serves a similar function as switch 28, is mounted on motor 23 at the opposite end of screw 22 from sequence switch 28. If desired, a hand crank may be used to drive the seismic section laterally.

Figure 3:
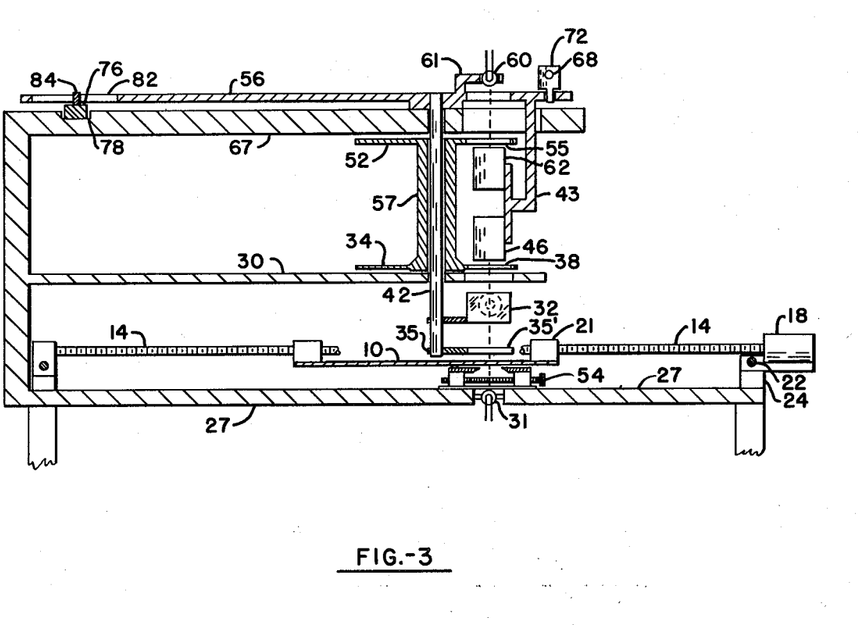
FIG. 3 is a fragmental cross-sectional view taken substantially at line III—III of FIG. 2.
Figure 4:
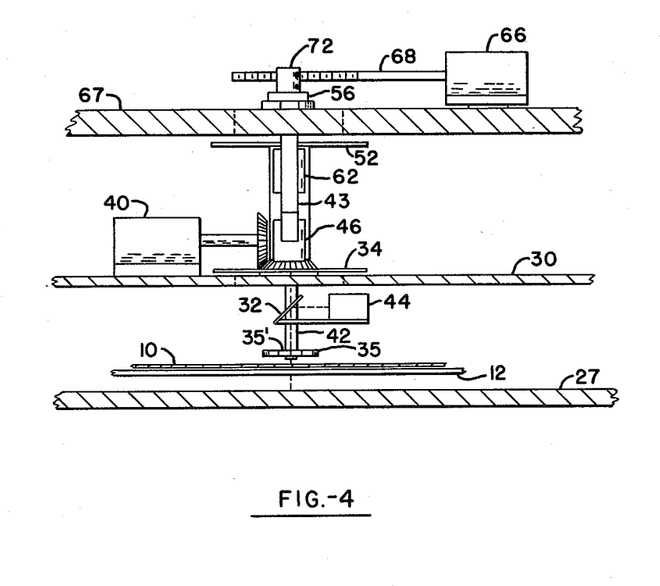
FIG. 4 is a fragmental cross-sectional view taken substantially at line IV—IV of FIG. 2.
Figure 5:
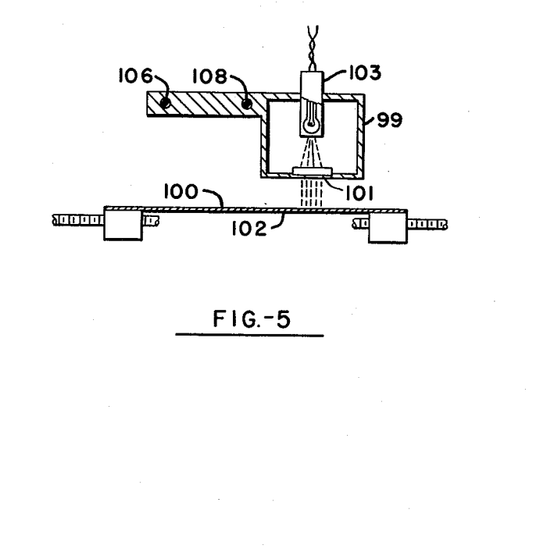
FIG. 5 is a sectional view taken substantially at line V—V of FIG. 2.

A light source 31 shown in FIG. 3 is positioned below the unmigrated section 10. The light source is preferably a wide area type of uniform intensity and may be stationary. A light guide 54 is provided to maintain a constant horizontal component of light; that it, horizontal with respect to the seismic section. The light guide 54 is preferably adjustable with respect to width as illustrated. The unmigrated section 10 is composed of a variable density photographic negative film which permits light to pass through the light portions of the records or areas of low densities which are transparent and permits practically no light to pass therethrough for the darker portions of the record which are opaque. Positioned above the unmigrated section and in a manner to receive the light images from the light source 31 is a light-splitting device such as a half-silvered mirror 32. A rotatable slotted disc 34 is spaced from and essentially parallel to the unmigrated section and is positioned above the half-silvered mirror 32. The radius of the slotted disc is preferably approximately that of the width of a seismogram upon the unmigrated section and is normally approximately 1″ to 4″ in diameter. The disc 34 contains one radial slot or aperture 38 whose function will become more apparent with the ensuing description. A shaft 42 is positioned above the seismic section and is supported from platform 30 which is substantially parallel to base 27. Disc 34 is rotatable about shaft 42 and half-silvered mirror 32 is rigidly attached to shaft 42 and will rotate with the rotation of shaft 42.

Positioned below the half-silvered mirror and above the seismic section is a light masking or channeling plate 35 which is provided with a scan aperture or narrow slot 35'. The aperture 35' is positioned to pass light through the half-silvered mirror 32. The light masking device 35 is rigidly attached to shaft 42 and rotates with the rotation of shaft 42. A motor 40 is provided for rotating disc 34 at a high rate of speed preferably in the range of about 900 r.p.m. to about 3600 r.p.m., with a preferred speed of 1800 r.p.m. Motor 40 is conveniently mounted on platform 30 which is substantially parallel to base 27.

A detector sensitive to light intensities such as photoelectric cell 44 is positioned adjacent mirror 32 so as to receive light beams from the half silvered mirror. Cell 44 should have sufficient screen area to detect transmission of light from mirror 32 and is used to transmit electrical signals to the recording device with the magnitude of the signals being proportional to the intensity of the light.

A detector sensitive to light intensities such as photoelectric cell 46 is arranged above disc 34 for receiving light transmitted through half-silvered mirror 32 as it passes through slot 38 of disc 34 as it scans the aperture 35' of mask 35. Cell 46 should have sufficient screen area to detect transmission of light from the various apparent angles of dip encountered. The photoelectric cell 46 is preferably mounted from shaft 42 by supporting element 43 which is rigidly attached through apertured bar 56 to shaft 42 and, of course, rotates with shaft 42. Photoelectric cell 46 is connected through electronic circuity to a photoelectric cell output rectifier and pulse shaper 48. This is used to detect the angle of the best crossing of the variable density section, or in other words, the apparent angle of dip. As the slotted disc 34 is rotated above the half-silvered mirror 32, various amounts of light will pass through the slot 38. At some point of each revolution of the disc a maximum light intensity will be detected by photoelectric cell 46. This will be the position of slot 38 in the disc 34 when slot 38 is directly above and parallel to the alignment of low density or light portions of the particular portion of the section being scanned or underlying the disc 34. It is at this point that the slot in the disc is parallel to the apparent angle of dip. The wave form from the photoelectric cell 46 is shaped in shaper 48 and the maximum point of the wave form which is indicated as a spike in the output from shaper 48 is selected in phase detector 50. The maximum point thus detected is a measure or an indication of the apparent angle of dip, $\theta$, as it is at that point that the maximum amount of light is passing through slot 38.

A second slotted disc 52 is adapted to be rotated about shaft 42 and is parallel to disc 34. The disc 52 has slot 55 which is in line with slot 38 of disc 34. Spool 57 rigidly connects discs 34 and 52 and is rotatable with respect to shaft 42. Positioned above disc 52 is a second light source 60 which is supported by support element 61. A third photoelectric cell 62 is also supported from support element 43 and is preferably positioned above photoelectric cell 46. The photoelectric cell 62 is connected to a pulse shaper 64 similar to pulse shaper 48. Pulse shaper 64 is connected to phase detector or phase sensitive discriminator 50 which compares the time of occurrence of the pulse from shaper 48 with the time of occurrence of the pulse from shaper 64; the reasons for this will be apparent hereinafter.

Affixed to shaft 42 is a slotted or apertured bar 56 containing slot 58 which is positioned normally above and in a plane parallel to disc 52. The bar 56 is positioned between light source 60 and slotted disc 52.

Momentarily summarizing, it will be seen that the maximum signal level or spike in the waveform output from a wave or pulse shaper 48 occurs responsive to the angle of slot 38 in disc 34 being aligned with the angle of dip on the seismograph. The spike or maximum output of the waveform from pulse shaper 64 occurs when the slot 58 of aperture bar 56 is parallel to slot 55 of disc 52. In the practice of this invention, it is desired that the aperture bar 56 be parallel to the apparent dip. In other words, bar 56 "tracks" the high density events of the seismogram which are indicative of dips. It will, of course, be understood that a different polarity of density could represent the dip. If bar 56 is not parallel to the apparent dip, then the electrical pulses received from photoelectric cells 46 and 62 through wave shapers 48 and 64 will not occur coincidentally. Phase detector 50 is provided to detect any difference in time of the occurrence of the two pulses. Upon any such detection of difference of occurrence of the signals, the detector means 50 is of a character to actuate motor 66 which in turn drives shaft screw 68 which rotates bar 56 about its axis (defined by shaft 42) to correct the position of the bar so that the bar is positioned parallel to the apparent or unmigrated dip. Or stated differently, the position of bar 56 in relation to a reference plane defines an angle equal to the apparent angle of dip.

The reference plane is defined by two lines, the first line being the axis of shaft 42 and the other line being a line representative of the horizontal components of seismic section 10 which passes through the base of the axis of shaft 42. It will be noted that motor 66 is swivel mounted upon base 70 which permits nut 72, which is pivotally attached to bar 56, to be driven in an arc in relation to the axis of shaft 42. Base 70 of motor 66 is supported by an upper platform 67 which is positioned above and parallel to platform 30. It is thus seen that as bar 56 is rotated, shaft 42 is likewise rotated which also orients the position of half-silvered mirror 32 in relation to the unmigrated section so that it will be positioned at the apparent angle of dip. Photoelectric cells 46 and 62, light source 60, and bar 56 are also rigidly attached to shaft 42 and will likewise be rotated with shaft 42.

Attention is now directed to the linkage mechanism in which rod 76 is slidably mounted in a T-shaped groove 78 in upper platform 67. Bar 56 contains slot 82 in which is slidably mounted pin 84 which is affixed to rod 76 in such a manner that the center of pin 84 is on the center line of rod 76. The center line of pin 84 is parallel to center line of shaft 42. One end of rod 76 has cross member 86 with slot 88 which is perpendicular to rod 76.

A supporting plate 90 pivoted about pivot 92 is provided with a pin 94 which is slidably mounted in slot 88. As rod 76 slides through groove 78, pin 94 is moved in an arc about pivot 92. The perpendicular distance from the center of shaft 42 to the center line of rod 76 is equal to the perpendicular distance from the center of pivot 92 to the center line of rod 76 which is also equal to the distance from the center of pivot 92 to the center of pin 94. The center line of pin 94 is parallel to the center line of shaft 42 and intersecting the center line of rod 76 when rod 76 is perpendicular to a line perpendicular to the center lines of pin 92 and pin 94. Positioned on plate 90 is a motor 96 which serves to drive a recording head or other printing assembly 98 along recording medium 100 which is mounted on support 102. Recording head 98 preferably includes glow tube 103, glow tube holder 99 and focusing lens 101. Motor 96 is synchronized with and in phase with motor 23 in order to insure that the travel time for recording device 98 to move the effective length or relative vertical component of the recording medium 100 will be the same as the travel time of the scanning means to scan the vertical length of and with respect to the unmigrated section. It will be noted that by making the proper mechanical adjustments, various desired scales may be used for the migrated section. The support medium 102 is capable of being driven laterally, that is, in a horizontal direction in respect to the migrated section being recorded on medium 100 by motor 104 which may be actuated by either sequence switch 28 or 29 which assures that the traces of the migrated section will be in the same order as the traces of the unmigrated section. A hand crank may be used in place of motor 104 to give the support 102 lateral movement. The recording head 98 may be slidably mounted upon rod 106 and driven by shaft screw 108 which is mounted at one end to motor 96. One end of rod 106 is mounted or attached to plate 90. The other ends of rod 106 and screw 108 are mounted to a supporting block 110 which is slidably supported in an arcuate slot 112 in base 114. In migrating a seismic section, the magnitude or distance of migration of each portion of the section, after the angle of dip has been corrected, will be proportional to the depth. It is therefore important that the section as it is being migrated will be reproduced so that the deeper part of the section will be recorded on medium 100 at the opposite end from pivot 92. At the opposite end of recording medium 100 for a given amount of correction of the angle of dip the recorder 93 will be displaced a maximum with respect to an unmigrated section. As the recording head 93 is moved toward pivot 92, the magnitude of migration will be progressively and proportionately less for any given angle of correction. It is thus seen that, relatively speaking, the unmigrated section must be positioned such that its "shallow end" is being scanned when the recording head 93 is near pivot 92 and likewise the "deep portion" of the unmigrated section is being scanned when the recording head is near the opposite end of support 102 from pivot 92. Amplifier 97 amplifies the electrical signal output from photoelectrical cell 44 and activates recording device 93 which plots the migrated section on photographic recording medium 100. It should be noted that glow tube 103 prints each signal only one time and everything is migrated automatically, both the weak and the strong crossings. As shown above, the half-silvered mirror 32 is rotated to be parallel to the apparent angle of dip. This permits the pick-up by photoelectric cell 44 to be picked up at the same angle as the apparent angle of dip. Recording head 93 is then positioned at the true angle of dip and a correct reproduction or printing is then made on recording medium 100. It will be noted that suitable hold circuity can be incorporated in the system to stop motors 23 and 96 and glow tube 103 until slot 58 is positioned at the apparent angle of dip or within the limits of a predetermined deviation.

Figure 6:
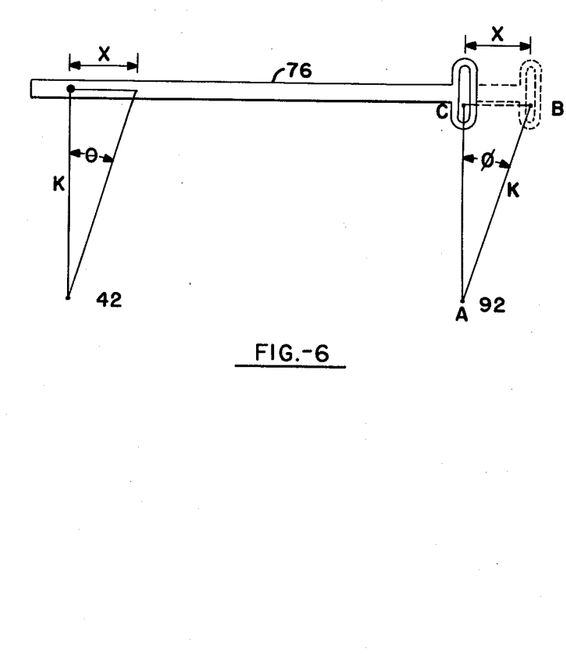
FIG. 6 illustrates the geometrical relation of the various members of the linking mechanism.

With the apparatus constructed as above described, the angle of apparent dip is detected; and, by the linkage described above, the recording device 93 is so positioned as to record the seismic section with each reflection in its proper position and true angle of dip on the recording medium 100. For a detailed explanation of how the analog or linkage mechanism converts the apparent angle into the true angle of dip, reference is now made particularly to FIG. 6. It will be noted that the apparent angle of dip from the unmigrated section is detected and controls the angle of the bar 56. The apparent angle of dip, $\theta$, is thus seen to be equal to the angle formed by the perpendicular from shaft 42 to rod 76 as one leg and the second leg being defined by the bar 56 which has rotated from the perpendicular to the rod the number of degrees, or a radial rotation, equal to the apparent angle of dip. In FIG. 6, the distance "K" is the perpendicular distance from the shaft 42 to rod 76; and the distance "K" is also equal to the distance of the pivot 92 to pin 94. Pivot 92 is also "K" distance perpendicularly from rod 76. When rod 56 has been rotated to angle $\theta$, the angle of apparent dip as detected from the unmigrated section, it will be noted that rod 76 moves laterally a distance "X." It is thus seen that the tangent of angle $\theta$ is equal to $X/K$. With "K" as unity, it is readily seen that the travel "X" of rod 76 is the tangent of the angle $\theta$. It will now be shown that the travel "X" is the sine of the angle $\phi$. As rod 76 moves laterally a distance "X", plate 90 revolves about pivot 92; and the distance "K," a fixed distance between pivot 92 and pin 94, will become the hypotenuse of a triangle ABC. A triangle ABC is thus formed defining an angle CAB whose sine is equal to $X/K$ as the distance CB is equal to X. Inasmuch as "K" is unity, the sine of the angle is equal to "X" which is also equal to the tangent of the angle $\theta$. It is thus seen that the angle CAB is the true angle of dip $\phi$, inasmuch as it has previously been shown that the tangent of the apparent angle of dip is equal to the sine of the true angle of dip. The carriers, rod 106 and screw 108 for recording head 93, are rigidly attached to plate 90 which is rigidly attached to the hypotenuse AB of triangle ABC. It is thus seen that the recording member is rotated the angle $\phi$ which is the true angle of dip. Therefore, the migrated section shows the angles of dip in their true direction and position.

Having described the nature and structure of the various components of the present invention and how they are related, attention is now briefly directed to a description of the manner in which the apparatus operates. Thus, an unmigrated section of the variable density type, preferably corrected for static and dynamic errors, is mounted on carrier 12. A photographic or photosensitive film 100 is likewise mounted on carrier 102. Recording device 93 is positioned at one end of the recording medium 100, and support member 12 is positioned such that the light source is positioned at one end of the unmigrated section 10. The light sources 60 and 31 are energized as well as are pulse shapers 48 and 64, motor 66, and amplifier 97. Motors 96 and 23 are started together to insure the same travel time of the recorder 93 for its movement with respect to the vertical component of the migrated section as the travel time of the section scanning means for its relative movement with respect to the vertical component of the unmigrated section. Simultaneously to starting motors 96 and 23, motors 40 and 66 are started. It will be noted that motor 40 drives scanning disc 34 and disc 52 at the same speed as they are rigidly connected and physically in phase. Discs 34 and 52 are preferably rotated at about 30 revolutions per second. The light source, the photoelectric cell, and the radial slit in the revolving disc operate cooperatively to determine or detect the angle of best crossing of the variable density section which is the detected angle of apparent dip. It is desired that the position of bar 56 and, likewise, accompanying slot 58 be the same as the apparent angle of dip of the unmigrated section. This is accomplished by phase detector 50 detecting the phase of the angle of light signal from photoelectric cell 62. If such output is out of phase with the output from photoelectric cell 46, then the phase detector 50 actuates motor 66 which rotates bar 56 into the correct angle corresponding to the angle of dip; and this is determined when the phase of the output signals of photoelectric cell 62 and photoelectric cell 46 are the same. When shaft 42 is thus rotated, it positions the half-silvered mirror 32 to be in line with the apparent angle of dip thus detected.

When rod 56 is rotated about the axis defined by shaft 42, it is seen that rod 76 is driven laterally a distance equal to the tangent of the apparent angle of dip, $\theta$. The recording mechanism mounted on plate 90 is likewise revolved about pivot 92 so that each reflections of the section is recorded in its true migrated position.

The recording device is continually positioned to print the section at a true angle of dip and at a migrated position as it moves the length of the rods 108 or the length of the section being reproduced. The travel time of the recording head 93 is the same as the travel time of the carrier 12, thus assuring a true reproduction. When the support member 12 reaches the end of its travel, it trips sequence limit switch 29 which reverses the rotation of motor 23 and, at the same time, actuates motor 13 to drive carrier 12 laterally until the next increment of the unmigrated section is in position for migration. Switch 29 also reverses motor 96 to drive recording head 98 in the opposite direction. Sequence switch 29 also actuates motor 104 to drive support 102 laterally so that recording head 93 will be in proper position for recording another vertical portion of the seismic section in a side-by-side relationship. A limit and sequence switch 28 reverses the carrier 12 when it reaches the other end of its travel. Switch 28 also reverses motor 96 and positions the recording head 93 preparatory to processing another increment of the unmigrated section. It is thus seen that a complete seismic section can be automatically migrated and reproduced on a reproducing medium, with the angle of dip corrected and reproduced in its true position.

It will be noted that the foregoing description has been concerned with merely one preferred structural embodiment of the invention. It will be apparent that numerous modifications may be incorporated within the apparatus without departing from the spirit or scope of the invention. For example the printing means may be of a character to impinge a light beam on a photosensitive film which varies in color responsive to the magnitude of the signals from the photoelectric cell which is positioned to receive light passed through the unmigrated section; the photosensitive film of course being of a character to produce a multi-colored record in response to the variable color light beam.

The invention claimed is:

1. An apparatus for preparing a migrated seismic section from an unmigrated variable density photographic negative-type seismic section which comprises in combination support means having a longitudinal dimension and adapted to support the unmigrated seismic section with the traces in longitudinal alignment with said support means; scanning means arranged to move longitudinally with respect to said section, said scanning means including a rotatable radially slotted disc spaced from and essentially parallel to said unmigrated section, a light source positioned on the opposite side of said section from said scanning means, a light-splitting device disposed between said disc and said unmigrated section, means for rotating said disc about a fixed axis, a photoelectric cell arranged to receive light waves from said light-splitting device which pass through said slot in said disc and adapted to detect the relative position of the slot of said disc when said slot is aligned with the apparent angle of dip of geologic horizons as indicated by reflections recorded on said unmigrated seismic section, and a second photoelectric cell for receiving light waves from said light-splitting device; a second slotted disc adapted to be driven at a speed synchronized with said first disc; a bar, a pivot for said bar intermediate the end of said bar and on the same axis on which said second disc rotates, with said bar being characterized by having a slot therein so positioned as to be capable of alignment with said slot in said second disc; a second light source disposed above said slot in said bar; a third photoelectric cell positioned opposite said second light source and arranged such that said bar and said second disc are between said second light source and said third photoelectric cell; a phase detector electrically connected to said first photoelectric cell and said third photoelectric cell; phase equalizing means responsive to said phase detector and capable of rotating said bar about its axis to bring the output signals of said third photoelectric cell into phase with said first photoelectric cell output; a second support means having a longitudinal dimension and adapted to support a photographic recording medium; a recording device capable of reproducing the migrated section on said medium from impulses received from said second photoelectric cell and movable longitudinally with respect to said medium along a support member pivoted at one end of said second support means; and linkage means connecting said bar with said support member for angular adjustment thereof responsive to said scanning means such that the sine of the angle of dip of geologic horizons as indicated by reflections recorded on said recording medium is equal to the tangent of the angle of dip as indicated on said unmigrated section.

2. An apparatus as defined in claim 1 in which the recording medium is a photosensitive film and the recording device includes a glow tube adapted to impinge a variable intensity light beam on the recording medium, the intensity of the light beam being responsive to the magnitude of the electrical signal output from said second photoelectrical cell.

3. An apparatus as defined in claim 2 in which the unmigrated seismic section is a variable density photographic section and the radial component of travel of the recording device is the same as the travel of the section scanning means.

4. An apparatus as defined in claim 1 wherein said linkage means includes said bar being further characterized by having an elongated aperture in the end opposite said slot, a rod being characterized by an appendage extending from said rod and with said appendage adapted to extend into said elongated aperture, said rod being further characterized by having a cross member at one end defining an aperture which is perpendicular to said rod, said rod being slidably mounted in support means such that when said bar is positioned parallel to the angle of dip when such angle is zero said bar is perpendicular to said rod; a support member for positioning said recording device characterized by being pivoted at a point equidistance from said rod as said pivot of said bar is from said rod, said support member being further characterized by having a pin member slidably fitted into said aperture in said cross member, the distance from said pin member to said pivot of said support member being equal to the distance from said pivot of said support member to said rod.

5. An apparatus for preparing a variable density migrated seismic section from a variable density seismic section which has been corrected for static and dynamic error and which contains unmigrated dipping reflections which comprises a first support member having a longitudinal dimension and adapted to support said section with the traces in longitudinal alignment with said support member; transducer and scanning means arranged to scan a plurality of traces of the corrected section, said transducer and scanning means including a light source arranged to impinge light on one side of said section, a rotatable radially apertured disc positioned on the other side of said section and parallel therewith, a first transducer arranged in relation to said disc to receive light passing through said aperture and not absorbed by said section and of a character to generate a train of electrical signals in response to variations in the intensity of the seismic record on the seismic section, a second transducer on said other side of said section adapted to generate an electrical signal in response to the proportion of the light which is not absorbed by said section, and a light-splitting device positioned to received light from said light source not absorbed by said section and adapted to direct one portion of said light to said second transducer and another portion of the split light toward said first transducer; means to effect straight line movement between said transducer and scanner means and said first support member, a second rotatably radially apertured disc adapted to be driven at a speed synchronized with said first disc, a bar pivoted intermediate of its end with its axis of rotation in line with the axis of rotation of said second disc, said bar being characterized by having a slot therein so positioned as to be capable of alignment with said aperture in said second disc, a second light source disposed above said slot in said bar, a third transducer positioned opposite said second light source and arranged such that said bar and said second disc is between said second light source and said third transducer, a phase detector electrically connected to said first and said third transducers, phase equalizing means responsive to said phase detector and capable of rotating said bar about its axis to bring the output signals of said third transducer into phase with said first transducer output, a second support member having a longitudinal dimension and adapted to support a photosensitive film, printing means having a recording device and longitudinal movement relative to said film and arranged to expose said film with light in response to the electrical signals received from said second transducer, linkage mechanism coupled to the recording device of said printing means and adapted to give angular displacement of said recording device responsive to said transducer means such that said recording device is angularly displaced from said longitudinal movement so that the section is reproduced in migrated form such that the sine of the angle of dip of geologic horizons as indicated by reflections recorded on said migrated section on said film is equal to the tangent of the apparent angle of dip as indicated on said unmigrated section.

6. An apparatus as defined in claim 5 in which the printing means is of a character to impinge a light beam on the photosensitive film which varies in color responsive to the magnitude of the electrical signal from said transducer means, and the photosensitive film is of a character to produce a multi-color record in response to the variable color light beam.

7. A scanning means for scanning a variable density photographic negative-type seismic section which comprises in combination: support means having a longitudinal dimension and adapted to support the seismic section with the traces in longitudinal alignment with said support means; scanning means arranged to move longitudinally with respect to said section, said scanning means including a first rotatable radially-slotted disc spaced from and essentially parallel to said section, a light source positioned on the opposite side of said section from said radially-slotted disc, a light splitting device disposed between said first disc and said section, means for rotating said first disc about a fixed axis, a photoelectric cell arranged to receive from said light splitting device light waves which pass through said slot in said first disc and adapted to detect the relative position of the slot of said disc when said slot is aligned with the apparent angle of dip of geological horizons as indicated by reflections recorded on said seismic section, and a second photo-electric cell for receiving light waves from said light splitting device; a second slotted disc adapted to be driven at a speed synchronized with said first disc; a bar; a pivot for said bar intermediate the ends of said bar and on the same axis on which said second disc rotates, with said bar being characterized by having a slot therein so positioned as to be capable of alignment with said slot in said second disc; a second light source disposed above said slot in said bar; a third photo-electric cell positioned opposite said second light source and arranged such that said bar and said second disc are between said second light source and said third photo-electric cell; a phase detector electrically connected to said first photo-electric cell and said third photo-electric cell; phase equalizing means responsive to said phase detector and capable of rotating said bar about its axis to bring the output signals of said third photo-electric cell into phase with the output of said first photo-electric cell.

8. An apparatus for preparing a migrated seismic section from an unmigrated seismic section which comprises in combination:
(a) supporting means for receiving and supporting an unmigrated seismic section;
(b) scanning means for detecting the apparent angle of dip of geological horizons indicated by recorded reflections on said section;
(c) driving means to move said scanning means relative to said section;
(d) a recording medium having a longitudinal dimension;
(e) reproducing means for reproducing increments of the seismic section, such increment being aligned along the apparent angle of dip as scanned by said scanning means;
(f) recording means for recording the increment reproduced by said reproducing means on said recording medium;
(g) means controlling said recording means and responsive to said reproducing means;
(h) means for moving said recording means movable longitudinally with respect to said recording medium;
(i) means responsive to said scanning means for angularly and laterally adjusting the position of the recording means relative to the longitudinal dimension of said recording medium such that the sine of such angle of adjustment is equal to the tangent of the apparent angle of dip detected by said scanning means.

9. An apparatus as defined in claim 8 in which the recording medium is a photosensitive film and the recording means includes a printing light source adapted to impinge a variable intensity light beam on the recording medium, the output from said reproducing means controlling the modulation of said printing light source.

10. An apparatus for analyzing and recording a reproducible multi-trace corrected seismic section which comprises:
(a) a first support member having a longitudinal dimension and supporting said section with the traces in longitudinal alignment with said support members;
(b) scanner means for scanning a plurality of traces in said section and detecting the apparent angle of dip of the geological formation indicated by recorded reflections on said section;
(c) reproducing means to generate electrical signals in response to intensity variations in the said section for reproducing increments of the seismic section, such increments being aligned with the apparent angle of dip as scanned by said scanner means;
(d) driving means to effect straight line movement between said scanner means and said first support member;
(e) a second support member having a longitudinal dimension and being of a character for supporting a recording medium;
(f) printing means responsive to signals generated by said reproducing means;
(g) means to effect straight line movement between said printing means and said medium;
(h) linkage means coupled to said printing means and responsive to the angle of dip detected by said scanner means for adjusting the position of the printing means angularly from the straight line movement and laterally adjusting the recording means relative to the longitudinal dimension of said second support means such that the sine of the angle of adjustment is equal to the tangent of the apparent angle of dip detected by said scanning means.

References Cited in the file of this patent
UNITED STATES PATENTS

| | | |
|---|---|---|
| 2,415,191 | Rajchman | Feb. 4, 1947 |
| 2,427,421 | Rieber | Sept. 16, 1947 |
| 2,442,098 | Schewell | May 25, 1948 |
| 2,686,633 | Hale | Aug. 17, 1954 |
| 2,800,639 | Lee | July 23, 1957 |
| 2,924,810 | Horeth | Feb. 9, 1960 |
| 3,076,175 | Skelton et al. | Jan. 29, 1963 |

FOREIGN PATENTS

| | | |
|---|---|---|
| 637,568 | Germany | Oct. 30, 1936 |